April 1, 1924.

A. L. BUTLER

ROAD SCRAPER

Filed April 22, 1922   2 Sheets-Sheet 1

ALVA L. BUTLER
INVENTOR.

BY Geo. P. Kimmel
ATTORNEY.

ALVA L. BUTLER
INVENTOR.

Patented Apr. 1, 1924.

1,489,114

UNITED STATES PATENT OFFICE.

ALVA L. BUTLER, OF IDAHO FALLS, IDAHO.

ROAD SCRAPER.

Application filed April 22, 1922. Serial No. 556,040.

*To all whom it may concern:*

Be it known that I, ALVA L. BUTLER, a citizen of the United States, residing at Idaho Falls, in the county of Bonneville and State of Idaho, have invented certain new and useful Improvements in Road Scrapers, of which the following is a specification.

This invention relates to wheeled scrapers, and has for one of its objects to provide a device of this character wherein means are provided for controlling all of the movements from the driver's seat and holding the scraper pan or bucket in operative or load receiving position, in load carrying position, in gradual load dumping position, in sudden load dumping position, and in scraping or road leveling position.

With these and other objects in view the invention consists in certain novel features of construction as hereinafter shown and described and then specifically pointed out in the claims, and in the drawings illustrative of the preferred embodiment of the invention:—

Figure 1:
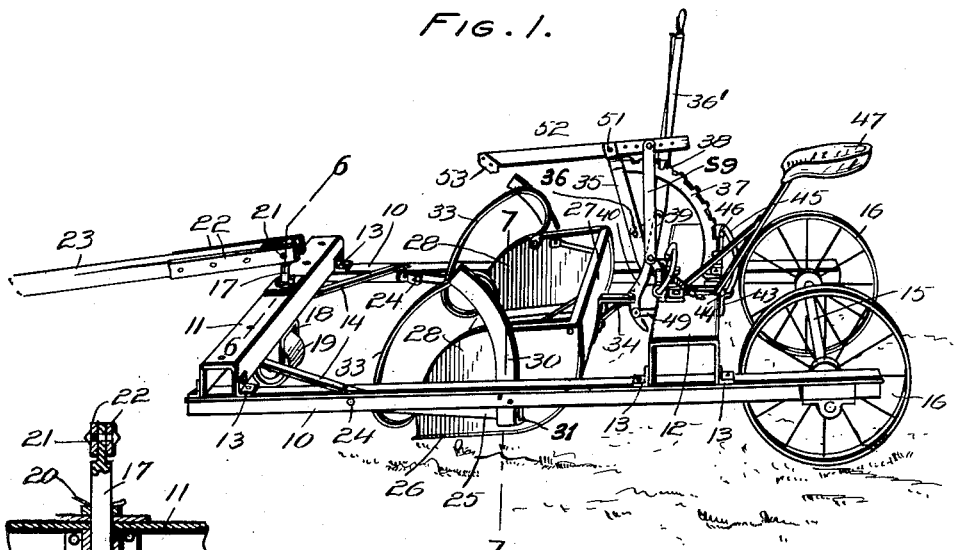
Figure 1 is a perspective view of the improved apparatus with the bucket or pan member in load receiving position.
Figure 6:
Fig. 6 is a sectional detail of the caster wheel and its supports.

The improved apparatus includes a supporting frame formed of spaced side members 10 preferably of L bars, a transverse forward member 11, preferably of an inverted channel bar, and an intermediate transverse member 12 also preferably of an inverted channel bar, the bars and side members being rigidly united as by brackets 13 and braces 14.

At their rear ends the side members 10 support an axle 15 carrying spaced bearing wheels 16.

Mounted for rotation through the forward frame member 11 is a standard 17, the latter forked at the lower end as at 18 to carry a caster wheel 19. The standard 17 is provided with means such as a cotter pin 20 to prevent vertical displacement of the standard and caster wheel.

Figure 2:
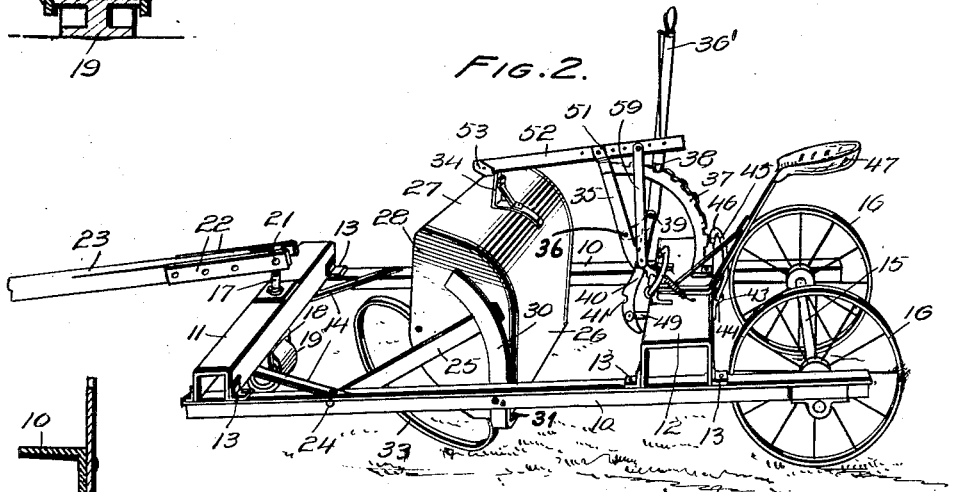
Fig. 2 is a similar view with the bucket or pan in scraping or road leveling position.
Figure 7:
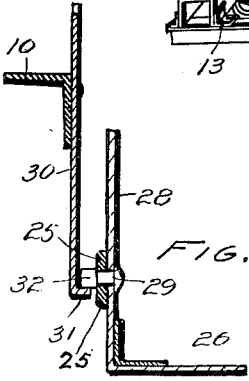
Fig. 7 is an enlarged sectional detail taken on the plane indicated by line 7—7 in Fig. 1 illustrating the construction of the pan support.

At its upper end the standard 17 is swingingly coupled by a pin 21 to cheek plates 22, between which a draft tongue 23 is connected, as shown in Figs. 1 and 2.

By this means any lateral swinging movement of the tongue 23 will be communicated to the caster wheel and "steer" the device in any desired direction, as will be obvious.

Pivoted at 24 to the side members 10 relatively near the forward transverse frame member 11, are radius bars 25, and pivoted at 29 to the free ends of the radius bars is the earth receiving pan or bucket. The pan or bucket is formed with a bottom member 26 and back member 27 merging into each other by a curved portion, and end members 28, the pivots of the radius bars being coupled to the end members 28 of the pan.

Attached to each of the frame members 10 is a curved guard member 30 each having an inturned lower end or stop 31, and each of the pivots 29 is extended outwardly as at 32 to form stops to engage the stops 31 and thus limit the movement of the pan in one direction.

Figure 4:
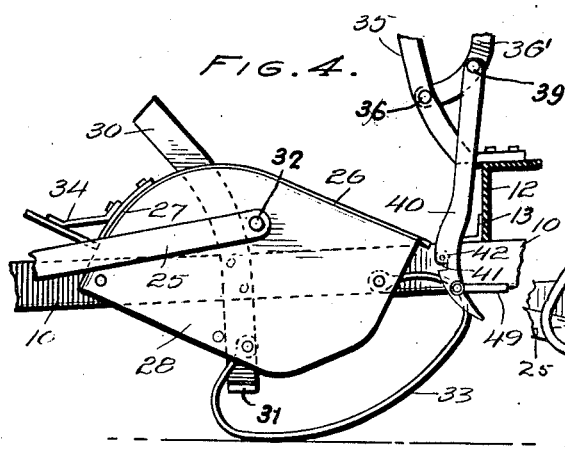
Fig. 4 is a detail view showing the bucket or pan in position to suddenly dump the load in a heap or mound.

Attached to the ends of the pan or bucket are curved shoes or runners 33 to engage the ground and hold the pan in position when inverted, as shown in Fig. 4. Attached to the rear wall 27 of the pan is a bracket device 34, its function to be hereafter explained.

Rigidly attached to the transverse member 12 is a standard 35, and pivoted at 36 to the standard is a lever arm 36', the latter operating over a notched segment 37 and held in adjusted position by a pawl device indicated at 38 and coacting with the notches of the segment.

Figure 3:
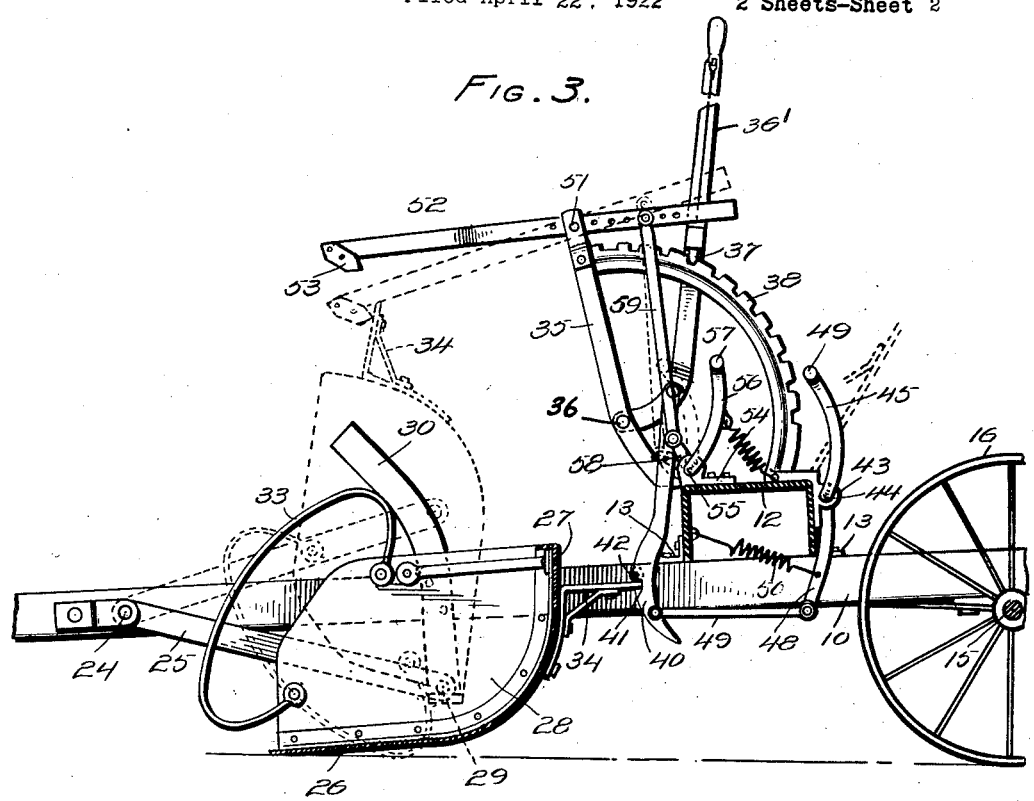
Fig. 3 is a longitudinal section on an enlarged scale, showing the parts arranged to hold the bucket or pan in load receiving position.

Pivoted at 39 to the lever 36' is a trip plate 40, the latter having a rearwardly curved lower portion and with a notch 41 to engage the outer end of the bracket 34 when the pan is in load receiving position, as shown in Figs. 1 and 3. The member 40 is provided with an antifriction roller 42 extending into the notch 41 to reduce the friction between the parts.

Mounted to swing in brackets 43 on the member 12 is a rock shaft 44 with an upwardly extending arm 45 at one end and also extended laterally to form a pedal 46 convenient to the driver on the seat 47. Depending from the rock shaft 44 is another arm 48 coupled at its free end by means of a link 49 with the lower curved portion of the trip member 40. A spring 50 is attached to the arm 48, to hold the latter yieldably in position.

Pivoted at 51 to the standard 35 is a trip bar 52, having a stop or catch 53 at its forward end. Mounted on the member 12 is a bracket 54, and rotative in the bracket is a rock shaft 55, and rising from the rock shaft at one end is an arm 56 having a pedal 57 at the upper end, and rising from the shaft 55 at the other end is an arm 58. The arm 58 is coupled to the bar 52 by a rod 59.

The bar 52 is provided with a plurality of spaced apertures to receive the pivots of the members 52 and 59, so that the "throw" of the member 52 may be changed as required.

With an apparatus thus constructed the operation is as follows.

Figure 5:
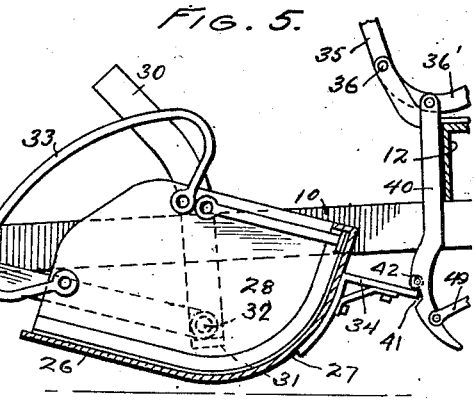
Fig. 5 is a side view showing the load receiving pan or bucket held in load transporting position.

To employ the apparatus as a scraper the pan or bucket is set as shown in Figs. 1 and 3, with the notch 41 of the member 40 bearing over the rear end of the bracket 34, which holds the pan in load receiving position. When the pan is full the driver draws the lever 36 to the rear and thus causes the depression of the member 40 and tilts the rear end of the pan downwardly and correspondingly elevates the "nose" portion and holds the load in the pan. The pawl 38 engaging in one of the notches of the segment 37, holds the lever 36 and the parts associated therewith in adjusted position, while the spring 50 retains the member 40 yieldably in engagement with the bracket 34 and with the bucket or pan free from the ground as shown in Fig. 5. The loaded bucket can thus be transported to the dumping ground and when that point is reached the lever 36 is moved forwardly to cause the member 40 to elevate the rear end of the bucket by its connection with the bracket 34 and depress the "nose" portion until it engages the ground. The pedal 45 is then actuated to draw the members 40 from engagement with the member 34 against the resistance of the spring 50 to permit the continued forward movement of the tractive force to cause the bucket to be overturned and the load dumped. If the bucket is to be completely overturned as represented in Fig. 4, the operator depresses the pedal 57 to cause the lever 52 to be disposed in the position shown by full lines in Fig. 3 and thus permit the free end of the bracket 34 to pass beneath the stop 53 so that the bucket will automatically assume the position shown in Fig. 4 with the "runners" or "skids" 33 engaging the ground.

If the bucket is not to be completely overturned or caused to assume the position shown in Fig. 2, with its "nose" portion directed downwardly, in position to level or spread the earth as it is discharged from the bucket, the bar 52 is left in the position shown by dotted lines in Fig. 3 with the stop 53 in the path of the free end of the bracket 34.

The bucket or pan will thus be held in leveling or load spreading position as the apparatus continues its forward movement.

If the load is to be gradually discharged, the bar 52 will be left in its downward position to cause the bucket to be only partly discharged or caused to assume the position shown in Fig. 2, and then the forward end of the bar 52 elevated to detach the stop 53 from the bracket 34 and permit the bucket to be completely overturned as in Fig. 4.

If the load is to be quickly dumped or deposited in a mound or pile, the member 52 is elevated by pressure applied to the pedal 57 to dispose the stop 53 above the path of the bracket 34 so that the bucket will be completely overturned, as will be obvious.

All of the various adjustments are made by the driver from his seat and without dismounting.

The improved device is simple in construction, can be manufactured of any size or capacity, and entirely of metal.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

1. In an apparatus of the class described, a supporting frame, carrier wheels supporting said frame, radius bars swinging from said frame near the front, hangers extending from said frame and with lateral stops at their lower ends, an earth engaging bucket swingingly supported on said bars, lugs carried by said bucket and adapted to engage said lateral stops and supporting the bucket in load receiving and load carrying positions, a rearwardly directed stop carried by said bucket, an operating lever swinging upon said frame, a trip arm pivoted to said lever and adapted to engage said rearwardly directed stop, and means for swinging said trip arm independently of the movement of said operating lever, whereby the bucket may be supported in load receiving position, or load carrying position, or released to permit the same to automatically assume an earth levelling position.

2. In an apparatus of the class described, a supporting frame, carrier wheels supporting said frame and adapted to constantly maintain the same in spaced relation to the ground, an earth engaging bucket swingingly supported relative to said frame, hangers depending from said frame and with stops at their lower ends, lugs carried by said bucket and adapted to engage said stops and supporting bucket in load receiving and load carrying positions, an operating lever swinging on said frame, a trip arm pivoted to said lever and adapted to be engaged with said bucket, and means for swinging said trip arm independently of the movement of said operating lever, whereby the bucket may be supported in load receiving position, in load carrying position, or released to permit the same to automatically assume an earth levelling position.

3. In an apparatus of the class described, a supporting frame mounted on carrier wheels and adapted to be maintained thereby in constant spaced relation to the ground, an earth engaging bucket swingingly supported relative to said frame, hangers depending from said frame with stops at their lower ends, lugs carried by said bucket and adapted to engage said stops and supporting the bucket in load receiving and load carrying positions, a bracket extending rearwardly from said bucket, a lever swinging relative to said frame, a trip arm swinging from said lever and having a notch to engage said bracket, a pedal device and coupling means between said pedal device and trip arm, whereby the trip arm is operative independently of the lever and the pedal device.

4. In an apparatus of the class described, a supporting frame mounted on carrier wheels and maintained thereby in constant spaced relation to the ground, an earth engaging bucket swingingly supported relative to said frame, hangers depending from said frame and with stops at their lower ends, lugs carried by said bucket and adapted to engage said stops for supporting the bucket in load receiving or load carrying positions, a bracket extending rearwardly of said bucket, an operating lever swinging on said lever, a trip arm swinging on said lever and yieldably supported and having a notch engaging said bucket, and a pedal device connected to said trip arm to release the same from engagement with said bucket independently of the action of said lever.

5. In an apparatus of the class described, a supporting frame mounted on carrier wheels and adapted to be maintained thereby in constant spaced relation to the ground, radius bars swinging from said frame, guide members attached to said frame and between which the radius bars operate and having inturned stops at their lower ends, an earth engaging bucket swingingly supported on said bars, lugs extending from said bucket and adapted to engage said inturned stops, a trip arm swinging relative to the frame and adapted to engage said bucket, and means for operating said trip arm.

6. In an apparatus of the class described, a supporting frame mounted on carrier wheels, radius bars swinging from said frame, guide members attached to said frame and having inturned stops at the lower ends, an earth engaging bucket swingingly supported on said bars, lugs extending from said buckets and adapted to engage said inturned stops, a trip arm yieldably engaging said bucket, and means for operating said trip arm.

7. In an apparatus of the class described, a supporting frame mounted on carrier wheels, radius bars swinging from said frame, an earth engaging bucket swingingly supported on said bars, guard members attached to said frame and having inturned stops, and stop lugs extending from said radius bars and into the paths of said inturned stops.

In testimony whereof, I affix my signature hereto.

ALVA L. BUTLER.